United States Patent [19]

Vamvakas

[11] 4,239,626
[45] Dec. 16, 1980

[54] FILTER FOR REMOVING FINES

[75] Inventor: Michael Vamvakas, Rocky River, Ohio

[73] Assignee: Niagara Bottle Washer Manufacturing Co., Cleveland, Ohio

[21] Appl. No.: 13,674

[22] Filed: Feb. 21, 1979

[51] Int. Cl.³ .................. B01D 33/06; B01D 23/06; B01D 35/16
[52] U.S. Cl. .................. 210/333.01; 210/393; 210/404; 210/433.1
[58] Field of Search .................. 210/325–326, 210/402, 333, 393, 404, 433 R, 411, 457, 304; 162/384; 15/327 RF, 246

[56] References Cited

U.S. PATENT DOCUMENTS

| 2,124,745 | 7/1938 | Morgan | 162/384 |
| 2,767,853 | 10/1956 | Saxe | 210/326 |
| 3,127,255 | 3/1964 | Winslow | 210/304 |
| 3,388,802 | 6/1968 | Kinson | 210/342 |
| 3,617,443 | 11/1971 | Chley | 162/384 |
| 3,868,327 | 2/1975 | Van Gilder et al. | 210/457 |
| 4,066,554 | 1/1978 | Guyer | 210/402 |
| 4,123,356 | 10/1978 | Suyimoto et al. | 210/333 R |

FOREIGN PATENT DOCUMENTS

| 37758 | 1/1931 | France | 210/411 |
| 552912 | 4/1943 | United Kingdom | 210/326 |

Primary Examiner—Charles N. Hart
Assistant Examiner—E. Rollins Cross
Attorney, Agent, or Firm—Baldwin, Egan, Walling & Fetzer

[57] ABSTRACT

A filter is disclosed for removing loose particles carried in a liquid stream such as loose paper particles in a bottle washing machine. An outer tank surrounds an inner rotatable finely perforated drum mounted on an axial shaft running throughout the drum and tank. The shaft is hollow with spaced perforations and a back-wash liquid may be passed through the shaft to wash away small paper particles which may stick to the drum after an operation of the filter cycle. The contaminated liquid enters the outer tank near one end and passes along the length of the drum and through the perforated periphery thereof then out a clear discharge opening at a far end of the device.

4 Claims, 3 Drawing Figures

FILTER FOR REMOVING FINES

An object of the invention is to provide a filter with a capacity for handling a large volume of liquid in a short time to remove all of the paper particles therefrom.

Another object of the invention is to provide such a filter with long periods of error-free use. Other objects and advantages of the invention will be apparent from the drawings and description and the essential features thereof will be set forth in the appended claims.

In the drawings FIG. 1 is a central sectional view through one embodiment of the invention;

FIG. 2 is an end view taken along the line 2—2 of FIG. 1 while;

Figure 1:
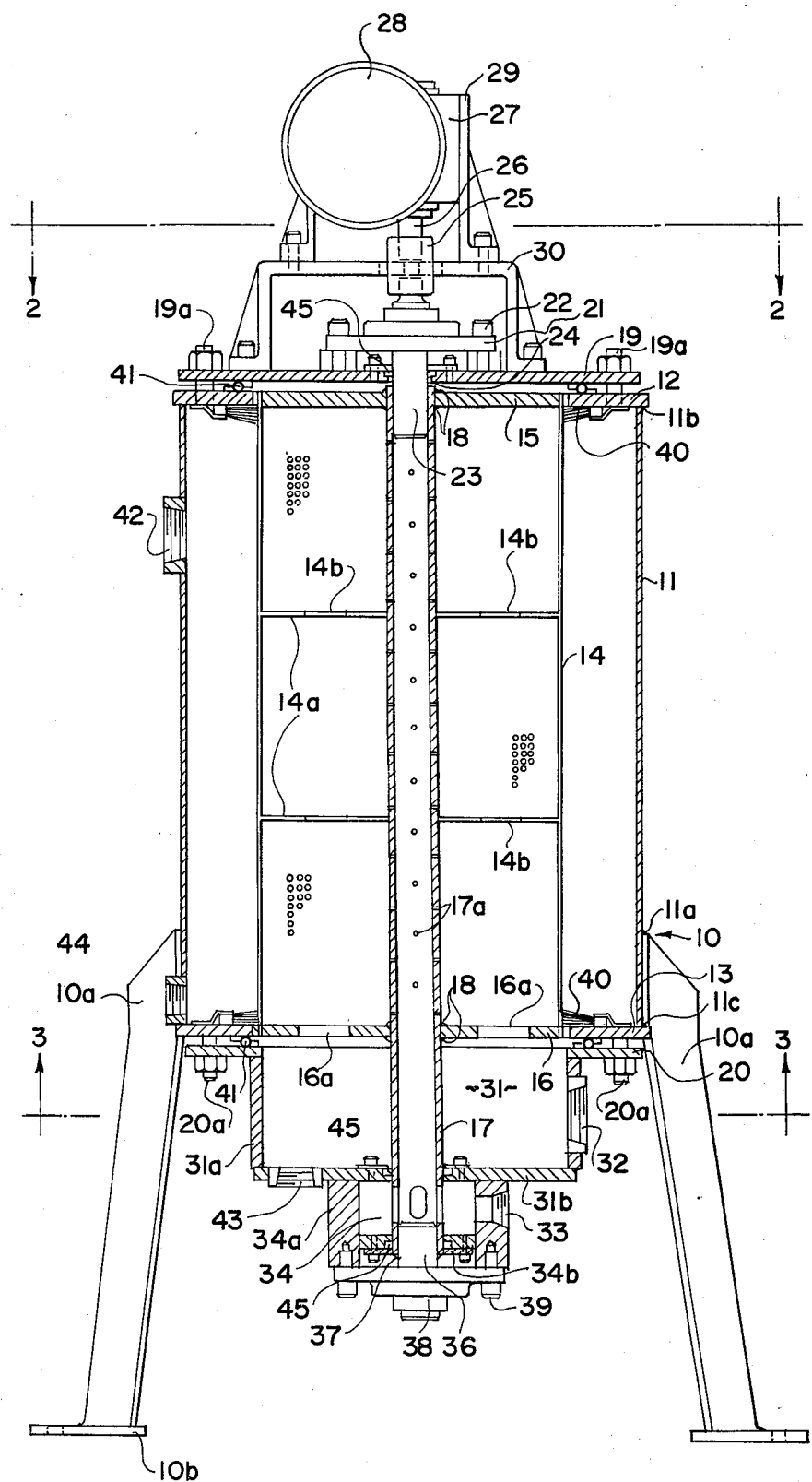
Figure 2:
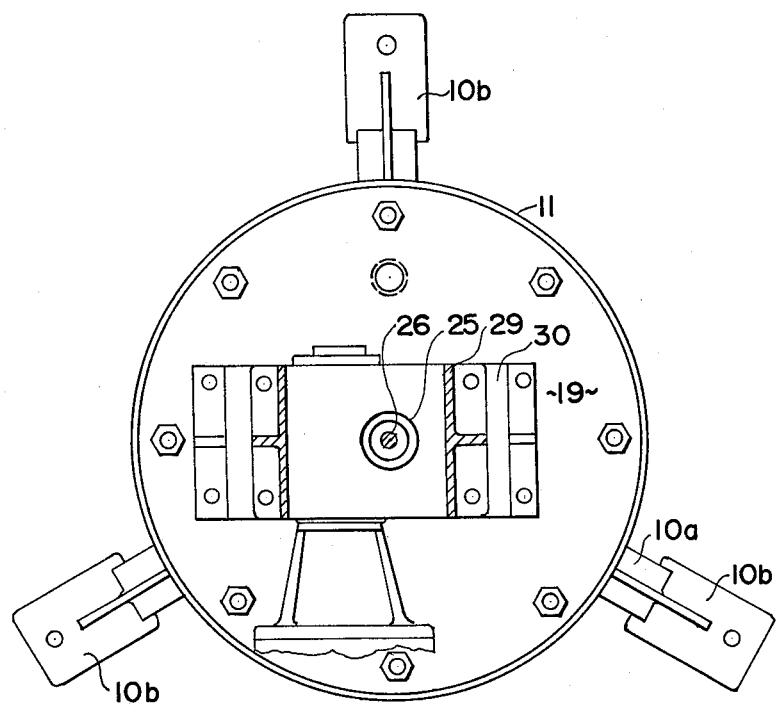

The invention comprises a frame 10 which comprises legs 10a to support the filter on a floor at the level 10b. Tank shell 11 might be included in the frame as well as partial end plates 12 and 13.

A cylindrical finely perforated drum shell 14 is provided concentric with the tank 11 and extending the full length thereof. One end of the drum is closed by an imperforate plate 15 and the other end is closed by a perforated end 16. The drum in one embodiment is about 24 inches long and about 12 inches in diameter, and the closely spaced perforations are about 1/16 inch in diameter and spaced in staggered rows about ⅛ inch apart over the entire drum shell. Axially of the drum there extends a hollow shaft 17 which is welded into the end plates at 18. The periphery of this shaft 17 is perforated, in one embodiment, with a plurality of ⅛ inch holes 17a for substantially the full extent of the drum shell 14, and these perforations may be located at four zones along the shaft 17 at 90 degrees spacing circumferentially.

Figure 3:
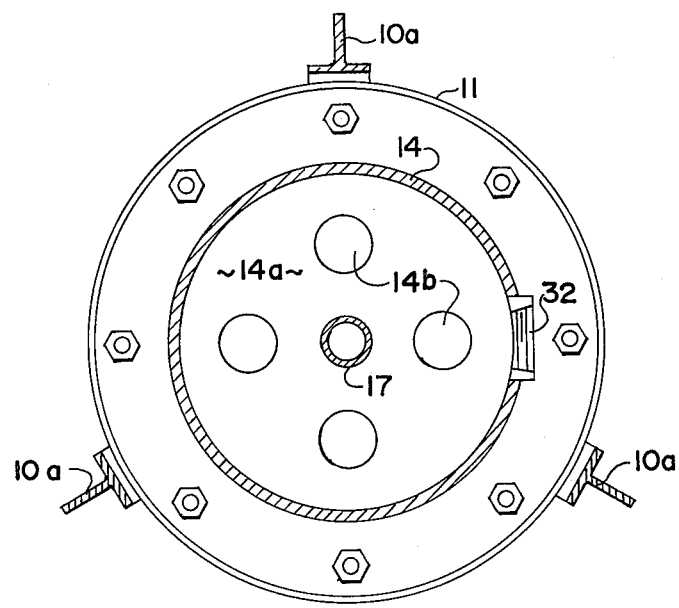
FIG. 3 is a sectional view of the same taken along the line 3—3 of FIG. 1.

The drum has transverse partition plates 14a dividing the interior of the drum outside of the shaft 17, in a plurality of chambers. These partitions 14a are imperforate except for a few openings which in the embodiment are 2 inches in diameter and surround the shaft 17 as seen in FIG. 3. The perforated end wall 16 has perforations 16a for free flow at that end of the drum, and these may be similar to the perforations 14b.

End frame members 19 and 20 are provided at opposite ends of the tank 14. The frame end member 19 is ridgidly secured to the partial end plate 12 by a plurality of bolts 19a. This member supports a bearing for the stub shaft 23 which fits tightly inside the shaft 17, and which is welded at 24 joining the stub shaft 23 and the shaft 17.

Outwardly to the left as viewed in FIG. 1, the stub shaft 23 is connected by a jaw type coupling 25 to a shaft 26 of a speed reduction unit which is operatedly connected with the electric motor 28. These parts are all mounted by brackets 29 and 30 to the frame end member 19.

At the opposite end of the device, as seen at the right hand end of FIG. 1, a discharge chamber 31a is provided for the discharge of clean fluid from the filter. This chamber comprises a cylindrical wall 31a and a flat end wall 31b, all parts being welded together as shown. This chamber communicates to the interior of the drum 14 through the perforated openings 16a. A discharge outlet is provided from the discharge chamber as indicated at 32.

An inlet for back-washing fluid is indicated at 33 which leads into a back-washing chamber 34 which comprises an outer cylindrical wall 34a and a closing end wall 34b. It will be seen in FIG. 1 that the hollow shaft 17 extends through the clean fluid chamber 31 in an imperforate manner and so on into the back-flushing chamber 34 where the tubular shaft 17 has a plurality of openings 35 where fluid goes into the tubular shaft 17 to exit at the openings 17a.

At the right hand end of shaft 17, as seen in FIG. 1, a stub shaft 36 is provided which fits snugly inside the tubular shaft 17 and is welded thereto as seen at 37. A stub shaft bearing (not shown) is in the bearing flange 38 which is secured by cap screws 39 to the back-flushing chamber wall 34a.

Annular seals 40 are provided between the partial end plates 12 and 13 and the drum 14 at its ends. These are preferably annular stainless steel brushes secured into the partial plates 12 and 13 and engaging the outer surface of the drum 14, by means of the bristles. Also, annular 0-ring seals 41 are provided at opposite ends of the tank 15 at one end between members 12 and 19 and between the members 13 and 20 at the other end.

An opening 42 is provided for inlet of dirty liquid between tank 11 and the drum 14. In this embodiment this is toward the left end of the tank 11 as seen in FIG. 1. An exit for clean flow of discharge fluid is indicated already at 32 near the opposite end of the structure.

Fresh water would normally be connected at the opening 33.

A drain opening 43 is provided in the clean filtrate chamber 31 and this opening would be normally closed by a plug. A drain 44 is provided at one end of the tank 11 and in actual practice this would be connected by means of a valve so that this drain might be automatically opened while the drum 14 is subjected to back-flushing.

Seals are provided at 45 to prevent leakage along shaft 17.

In operation of this filter device, the contaminated fluid from the bottle washing machine, comprising caustic soda in which are floating paper particles, enters the filter at 42. The drum is then being rotated by the motor 28. The paper particles are collected on the outer face of drum 14. The clean filtrate passes through openings 14b and 16a and through the chamber 31 and through the outlet 32 and normally will be sent back to the bottle washing machine for reuse. A control will be provided for this invention so that, when the pressure at the outlet 32 decreases because the bulk of the liquid has already passed through the filter, then the automatic control will shut off the intake at 42 and about 10 seconds later turns off 32, and then turns on the back-flush stream at the opening 33, at the same time opening the drain outlet 44 and starting the motor 28.

What is claimed is:

1. A filter for removing loose particles carried in a liquid stream, comprising a frame, an imperforate cylindrical tank wall mounted on said frame, a generally hollow generally perforated shaft rotatably mounted on said frame and extending axially through said tank, a cylindrical perforated drum concentric and rigid with said shaft and spaced between said shaft and said tank, said drum having closely spaced perforations all over, a closed circular end for one end of said drum extending between said drum and said shaft and rigidly secured to said shaft, a perforated circular end for the other end of said drum extending between said drum and said shaft and rigidly secured to said shaft said hollow shaft extending outwardly beyond each of said ends, annular partial end plates on said frame rigidly secured to said tank at its opposite ends, said partial end plates extending from said tank to locations adjacent said drum and substantially co-planar with said circular ends, a continuous annular seal at each of said locations secured to the associated partial end plate and engaging said drum, a discharge chamber on said frame downstream from said drum at the perforated end thereof and in communciation therewith, a discharge outlet for said chamber for cleansed liquid, an inlet device at the opposite end of said tank for inlet of dirty liquid, a source of back-flushing liquid communicating with one end of said hollow generally perforated shaft, said shaft passing through said discharge chamber and being imperforate there, a controlled exit in said tank for disposal of back-flushed material, and an electrical motor drivingly connected with one end of said hollow shaft.

2. A filter as defined in claim 1, including between one and three radially extending partitions in said drum extending between said drum and said hollow shaft, each of said partitions being imperforate except for a few flow openings spaced around each partition in a zone intermediate said drum and said hollow shaft.

3. A filter as defined in claim 1, wherein said drum is about 24 inches long and about 12 inches in diameter, said closely spaced perforations are about 1/16th inch in diameter and spaced in staggered rows about ¼ inch apart over said entire drum.

4. A filter as defined in claim 1, wherein each said annular seal comprises an annular brush.

* * * * *